June 14, 1949.    S. GYNT    2,473,144
WINDING ARRANGEMENT IN ALTERNATING CURRENT MACHINES
Filed July 2, 1947
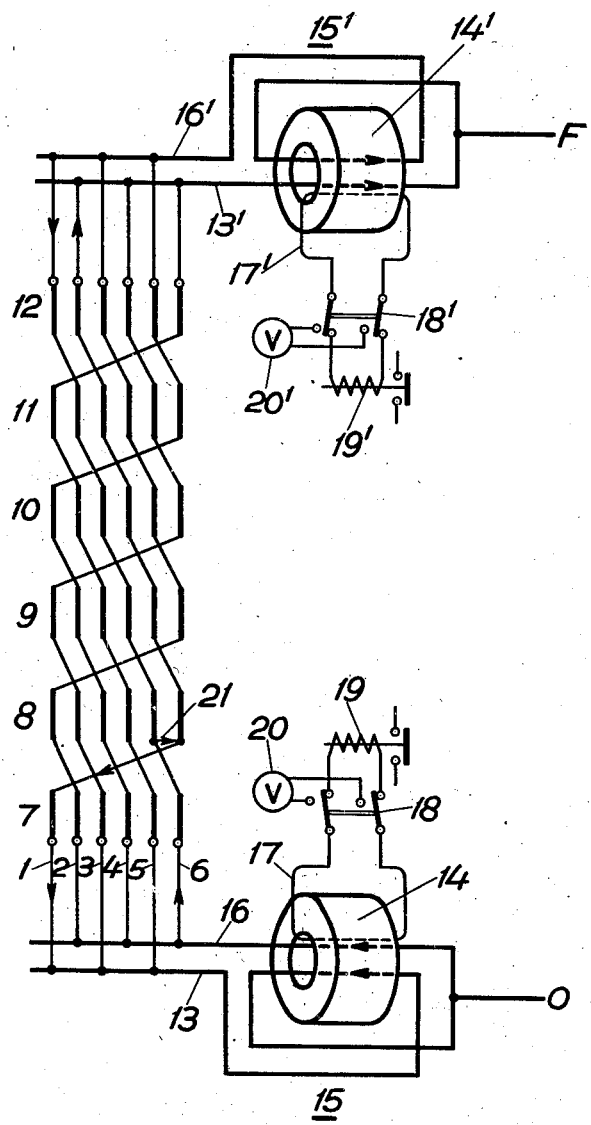
Inventor
SVEN GYNT
By Ermer Aiken
Attorney.

Patented June 14, 1949

2,473,144

UNITED STATES PATENT OFFICE 2,473,144

WINDING ARRANGEMENT IN ALTERNATING CURRENT MACHINES

Sven Gynt, Vasteras, Sweden, assignor to Allmanna Svenska Elektriska Aktiebolaget, Vasteras, Sweden, a corporation of Sweden Application July 2, 1947, Serial No. 758,645
In Sweden July 8, 1946

4 Claims. (Cl. 171—252)

In large electrical generators and other alternating current machines, the voltage induced in the different strands in the slots will be different due to the fact that the magnetic field acting on the strands in the slot will not be the same along the whole depth of the slot. If therefore, in a generator, the circuit has a plurality of parallel coupled strands, there will be an equalisation current between the strands, if the voltage induced in the different strands were not equalized thereby that the strands were transposed from slot to slot, so that the mean position in relation to the slots will be the same or practically the same for all parallel-connected strands. As, however, in a slot and the end windings belonging to the slot there is a certain voltage difference between the different strands it is necessary to insulate them from each other. If by some reason this insulation should be faulty there occurs equalisation currents between the strands, which currents can get considerable values. In order to detect such faults previously used method has been to connect the strands when they leave the machine into two groups, so that one group has contained alternate strands and the other group the strands between them, and the currents from these groups have in opposite direction been conducted each through its own primary winding of a current transformer with two primary windings or through the primary winding of separate current transformers differentially coupled. The secondary winding or secondary windings respectively have then been connected with an indicating device. The equalisation current caused by a fault in the insulation has in this manner been possible to indicate or to be measured, and by this device it has also been possible to detect a break of the strands.

The present invention has for its object an improvement of the known arrangement and is characterized thereby that the currents coming from the two groups of the strands of the machine in one or both ends of each phase in opposite directions traverse a reactor, which may be provided with a secondary winding with a high resistance, to which winding a relay or also a voltmeter may be connected. By this arrangement the advantage is gained that not only a fault in the insulation or a break in a part is indicated but also that a limitation of the equalisation current caused by the fault in the insulation is obtained.

On the accompanying drawing a form of the invention is schematically shown, where 1—6 designate the strands of the machine located in the slots 7—12. The parts of the strands within the slots are designated by thick lines, whereas the connections between them outside of the slots are designated by fine lines. In each end of the winding the strands are assembled, so that in one end the strands 1, 3 and 5 are joined with each other and by means of conductors 13 and $13^1$ which traverse the cores 14 and $14^1$ of reactors 15 and $15^1$ respectively at the end points of the winding before they are connected with the neutral point of the machine or its terminal. The strands 2, 4 and 6 are in the same manner joined with each other and with conductors 16 and $16^1$, which also traverse through the cores 14 and $14^1$ before they are joined with the neutral point or terminal of the machine, but these conductors traverse the cores 14 and $14^1$ in a direction opposite to the conductors 13 and $13^1$. On the cores 14 and $14^1$ also secondary windings 17 and $17^1$ are arranged, which have a comparatively high resistance, and which by means of switches 18 and $18^1$ may be connected either with disconnecting tripping relays 19 and $19^1$ or voltmeters 20 and $20^1$.

As under normal conditions, the voltage induced in the different strands will be the same or practically the same, the currents through the conductors 13 and 16 will be equal and as they traverse the core 14 in opposite directions, they are not able to induce any field in this core, and the same will be the conditions in the reactor $15^1$. If, however, a fault should occur for instance in the point 21 between the strand 1 and the strand 6, it is evident that due to the difference of the voltages induced in strand 1 and strand 6 in slot 7, a circulating current occurs, for instance as shown by the arrows on the drawing, and in the same manner due to the difference between the induced voltages of the strands 1 and 6 in the other slots, there occurs a circulating current through the conductors $13^1$ and $16^1$. Due to the action of the reactors 15 and $15^1$, these currents, however, will be reduced to a small fraction of the value they should have, if the reactors 15 and $15^1$ should be omitted or should be normal current transformers.

In certain cases, each phase consists of a plurality of parallel-connected circuits, each containing a plurality of strands. Also in this case, the invention can be applied thereby that each separate circuit is provided with reactors or thereby that the strands from the different circuits are joined and the strands thus joined in above described manner are connected into groups for the connection to the windings of the reactors. In the same manner it is possible in a star-connected winding or in delta-coupled machines first to join the strands from the different phases before they are assembled to groups connected to the conductors through the reactors and thus before all parts are joined in the neutral point or at the terminal.

In the part of the description belonging to the attached drawing, it is supposed that each slot contains only one conductor. It is, however, obvious that the invention also is applicable in the case that the slot contains a plurality of conductors. The strand transposition shown is also only shown as an example and can be made in other manners between the different slots and also in the slots themselves.

I claim as my invention:

1. Arrangement in electric alternating current machines, comprising windings with conductors having a plurality of strands which change their relative positions in the slots of the machine when proceeding from one slot to another, a reactor at each end of the said windings, two opposing reactor windings, a connection between alternate strands in the winding of the machine and one end of one reactor winding, a connection between the remaining strands of the winding of the machine and one end of the other reactor winding, and means coupling the other ends of the reactor windings.

2. Arrangement in electric alternating current machines, comprising a plurality of windings each divided into a plurality of circuits, the conductor of each circuit consisting of a plurality of strands which change their relative positions in the slots of the machine when proceeding from one slot to another, a reactor at each end of the said windings, two opposing reactor windings, alternate strands of the circuits being connected with one end of one of the reactor windings, the remaining strands of the circuits being connected with one end of the other reactor winding, and means connecting the other ends of the reactor windings.

3. Arrangement in electric alternating current star-connected machines, comprising a multiphase winding with conductors having a plurality of strands which change their relative positions in the slots of the machine when proceeding from one slot to another, a reactor at each terminal of the machine, a reactor at the star point of the winding, said reactors being provided with two opposing windings, alternate strands of the conductors at the terminals being joined with one end of one winding of the reactor, the remaining strands being joined with one end of the other winding of the reactor and at the star point of the winding, corresponding strands of the phases being joined by an equal number of conductors, alternate conductors being joined with one end of one winding of the reactor, the remaining conductors being joined with one end of the other winding of the reactor, and the other end of the reactor windings being connected together and with the star point.

4. Arrangement in electric alternating current delta-connected machines, comprising a multiphase winding with the conductors having a plurality of strands which change their relative positions in the slots of the machine when proceeding from one slot to another, a reactor at each terminal of the machine, said reactors being provided with two opposing windings, alternate strands of the conductors at the terminals being joined with one end of one winding of the reactor, the remaining strands being joined with one end of the other winding of the reactor and at the terminals of the machine, corresponding strands of the phases being joined by an equal number of conductors, alternate conductors being joined with one end of one winding of the reactor, the remaining conductors being joined with one end of the other winding of the reactor, and the other end of the reactor windings being connected together and with the terminals of the machine.

SVEN GYNT.

REFERENCES CITED

The following references are of record in the file of this patent:

UNITED STATES PATENTS

| Number | Name | Date |
|---|---|---|
| 1,892,533 | Perry et al. | Dec. 27, 1932 |